(12) United States Patent
Page

(10) Patent No.: US 9,416,946 B1
(45) Date of Patent: Aug. 16, 2016

(54) FLASHLIGHT FITTING FOR LIGHT PAINTING PHOTOGRAPHY

(71) Applicant: Jason D Page, Tequesta, FL (US)

(72) Inventor: Jason D Page, Tequesta, FL (US)

( * ) Notice: Subject to any disclaimer, the term of this patent is extended or adjusted under 35 U.S.C. 154(b) by 77 days.

(21) Appl. No.: 14/490,799

(22) Filed: Sep. 19, 2014

Related U.S. Application Data

(60) Provisional application No. 62/014,812, filed on Jun. 20, 2014.

(51) Int. Cl.

| | | |
|---|---|---|
| *F21V 17/04* | (2006.01) | |
| *F21V 9/08* | (2006.01) | |
| *G02B 6/04* | (2006.01) | |
| *G03B 17/56* | (2006.01) | |
| *F21V 11/00* | (2015.01) | |
| *F21W 131/40* | (2006.01) | |

(52) U.S. Cl.
CPC . *F21V 17/04* (2013.01); *F21V 9/08* (2013.01); *F21V 11/00* (2013.01); *G02B 6/04* (2013.01); *G03B 17/565* (2013.01); *F21W 2131/40* (2013.01)

(58) Field of Classification Search
CPC ........... F21V 17/04; F21V 9/08; F21V 11/00; G02B 6/04; G02B 17/565; F21W 2131/40
USPC ......... 362/433, 434, 435, 436, 208, 355, 565, 362/311.01
See application file for complete search history.

(56) References Cited

U.S. PATENT DOCUMENTS

| | | | | |
|---|---|---|---|---|
| 3,644,725 A | * | 2/1972 | Lochridge, Jr. ....... | F21S 10/005 362/556 |
| 4,697,228 A | * | 9/1987 | Mui .......................... | F21L 4/02 362/208 |
| 4,740,874 A | * | 4/1988 | Wylie ....................... | F21L 11/00 362/187 |
| 4,967,321 A | * | 10/1990 | Cimock .................. | A63H 33/00 362/101 |
| 5,037,346 A | * | 8/1991 | Cimock .................. | A63H 33/00 362/806 |
| 5,383,103 A | * | 1/1995 | Pasch ....................... | F21L 11/00 362/102 |
| 6,409,358 B1 | * | 6/2002 | Grover .................... | G09F 13/04 362/109 |
| 6,909,360 B2 | * | 6/2005 | Chen ......................... | F21L 4/00 340/321 |
| 7,172,312 B2 | * | 2/2007 | Chen ....................... | F21L 4/022 362/202 |
| 8,651,688 B1 | * | 2/2014 | Golden .................. | F21V 7/0075 362/190 |
| 2003/0099104 A1 | * | 5/2003 | Hou ........................ | F21L 4/005 362/202 |
| 2005/0254244 A1 | * | 11/2005 | Stern ........................ | D04D 7/06 362/253 |
| 2008/0144325 A1 | * | 6/2008 | Van Dyn Hoven ..... | F21V 17/10 362/353 |
| 2008/0278929 A1 | * | 11/2008 | Lorati ...................... | D04D 7/04 362/109 |

* cited by examiner

*Primary Examiner* — Laura Tso
(74) *Attorney, Agent, or Firm* — John Ryznic

(57) ABSTRACT

A universal connector to hold different diameter light emitting devices for use in light painting photography, where the connector is a hollow connector with one end for insertion of a light modifying device and an opposite end having a conical shape so that different diameters of light emitting devices can be quickly changed during a light painting photography exposure. The connector with ridges on an inner surface is made from a soft material that is rigid enough to hold the devices so that different lighting can be quickly produced during a long exposure of a camera.

20 Claims, 18 Drawing Sheets

FLASHLIGHT FITTING FOR LIGHT PAINTING PHOTOGRAPHY

CROSS-REFERENCE TO RELATED APPLICATIONS

This application claims the benefit to Provisional Application 62/014,812 filed on Jun. 20, 2014 and entitled FLASHLIGHT FITTING FOR LIGHT PAINTING PHOTOGRAPHY.

GOVERNMENT LICENSE RIGHTS

None.

BACKGROUND OF THE INVENTION

1. Field of the Invention

The present invention relates generally to light painting photography, and more specifically to a universal connector between a light source such as a flashlight and a light modifying device used in the art of light painting photography.

2. Description of the Related Art Including Information Disclosed Under 37 CFR 1.97 and 1.98

Light painting photography is a form of art in which a camera with a long exposure captures an image in which one or more light emitting devices are used. One such example of light painting photography is when an artist goes out to a tree in the dark and opens a digital camera to a long exposure facing the tree. The artist then shines light from a flashlight onto different sections of the tree to light up the sections. All this is done while the camera is capturing the image. During the exposure, the artist can use a different light emitting source to add additional lighting affects to the image being captured.

In another form of light painting photography, an artist will use a flashlight connected to a light modifying device such as a color filter or an object that lights up from the source of light such as a flashlight shining into a plastic milk jug. The artist will wave around the illuminated device while the camera is capturing an image.

BRIEF SUMMARY OF THE INVENTION

A universal connector for light painting photography in which a light emitting device shines a light through a light modifying device that is moved about while a long exposure from a camera captures the image of the moving light. The connector is made from a soft but rigid material and has a conical shaped end with ridges on the inner surface in which several different diameters of a light emitting device such as a flashlight can be quickly removed and inserted. The connector has a smaller diameter end also with ridges so that a holder of a light modifying device can be quickly changed during a long exposure of the camera.

DETAILED DESCRIPTION OF THE INVENTION

The present invention is a universal connector to be used for attaching a light emitting device to a light modifying device for use in light painting photography. A source of light is projected on to a surface during a long exposure photograph to produce a work of art. One example is the use of a flashlight projecting a white light through a colored plastic filter to produce a colored light while the camera is exposing. The light source is moved over the surface to produce different patterns or colors. The universal connector connects a light emitting device to a light modifying device. A holder holds a light modifying device so that the light modifying device can be secured or connected to the universal connector.

Figure 1:
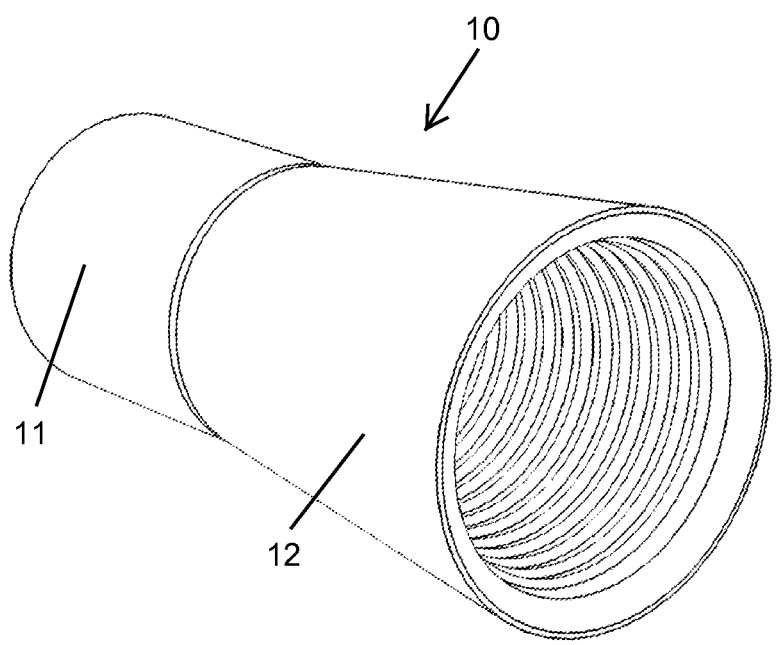
FIG. 1 shows an isometric view of the flashlight fitting from the light source end of the present invention.

FIG. 1 shows an isometric view of the flashlight fitting universal connector (connector) 10 of the present invention with one end 11 for inserting a light modifying device such as a colored plastic filter and an opposite end 12 for inserting a light emitting device such as a flashlight. The light emitting device end 12 is cone shaped so that various diameters of flashlights can be inserted using the same connector 10. The connector 10 is made from a soft material that is rigid enough to hold the devices so that different lighting can be quickly produced during a long exposure of a camera.

Figure 2:
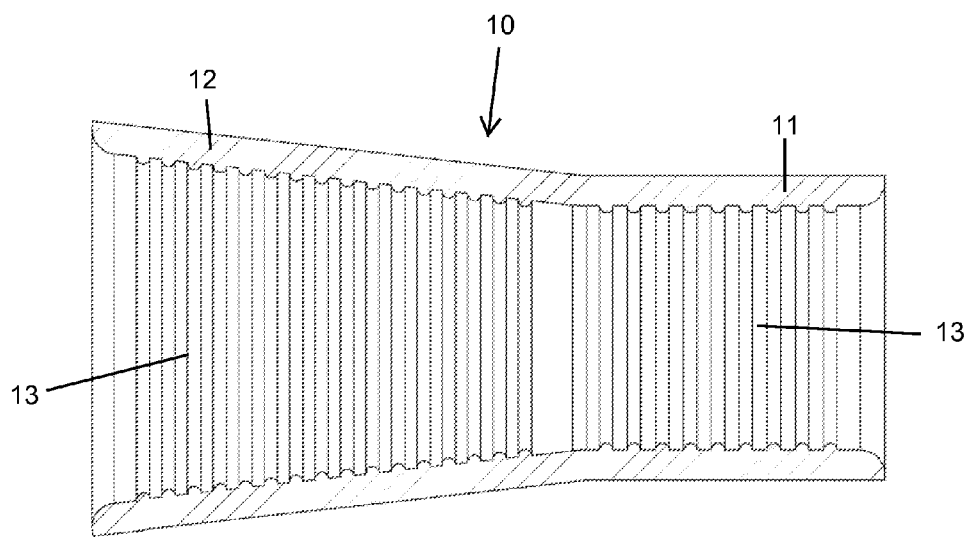
FIG. 2 shows a cross section view of the flashlight fitting of the present invention.

FIG. 2 shows a cross section side view of the universal connector 10 with the two ends. The inside surfaces of the connector (universal connector) 10 includes raised portions 13 or ridges for the purpose of gripping the devices such as a flashlight or a light modifying device such as a colored filter that are inserted. The universal connector 10 is made from a soft rubber so that it is flexible but also to retain its shape. The universal connector 10 with the larger diameter conical shaped end 12 is to receive the light emitting device such as a flashlight. The conical shape allows for different diameters of flashlights to be quickly inserted and changed into the connector.

With the connector 10 of the present invention, an artist can insert different sizes of flashlights into the wider end 12 and project the light into a light modifying device while a camera is exposing. Another use in photography for the connector 10 is to project a light to a surface in which various diameters of light sources can be inserted into the same connector so that the light modifying device does not have to be changed each time a different size light emitting device such as a flashlight is used.

Figure 3:
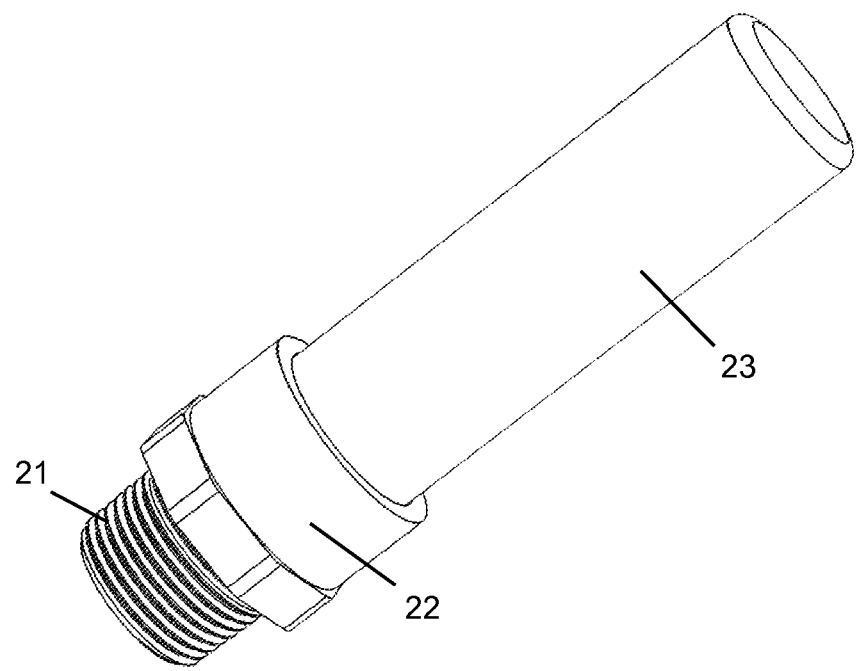
FIG. 3 shows an isometric view of a translucent light painting photography brush of the present invention.

FIG. 3 shows an isometric view of a translucent cylinder shaped light painting brush with a translucent cylinder 23 connected to a holder 22 having a ridged end 21 that is placed in the cylindrical shaped end 11 of the universal connector 10. When a flashlight or light emitting device is inserted into the conical shaped end 12 of the connector, the light will pass through the translucent cylinder 23 as produce light that can then be captured by the camera. The person holding the assembly will move the assembly in a pattern of motions that the camera will capture to produce a light painting.

Figure 4:
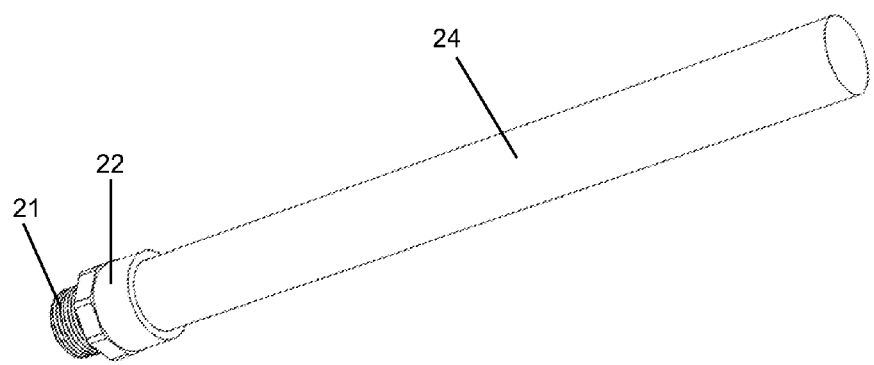
FIG. 4 shows an isometric view of a Plexiglas rod shaped light painting photography brush of the present invention.

FIG. 4 shows an isometric view of a Plexiglas rod shaped light painting brush 24 attached to the holder 22 that can be placed within the universal connector 10 and used for light painting when a light emitting device shines light through the Plexiglas rod shaped light painting brush 24. The rod 24 is formed from a solid piece of Plexiglas.

Figure 5:
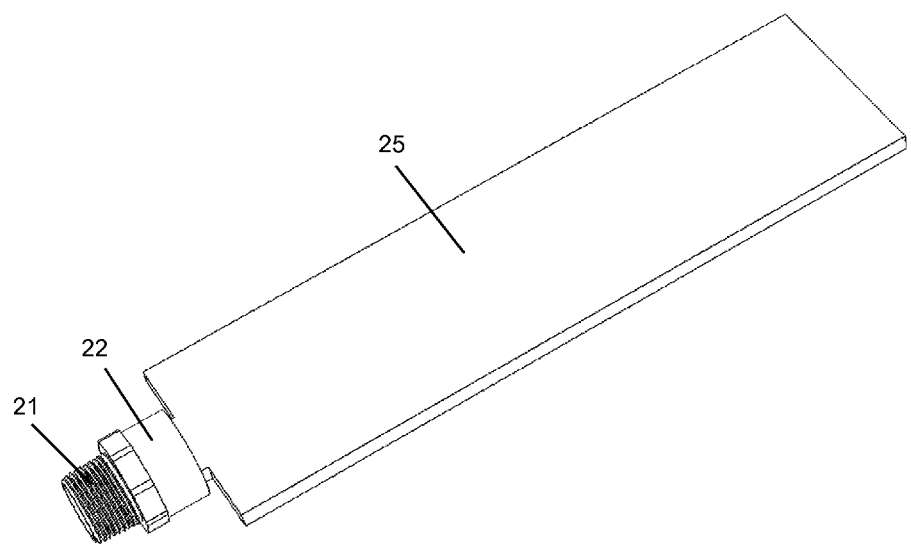
FIG. 5 shows an isometric view of a Plexiglas rectangular shaped light painting photography brush of the present invention.

FIG. 5 shows an isometric view of a Plexiglas flat and rectangular shaped light painting brush 25 secured to the holder 22. When a light source such as a flashlight is emitted through the holder 22 and into the flat rectangular piece 25, light will be emitted along the thin edges.

Figure 6:
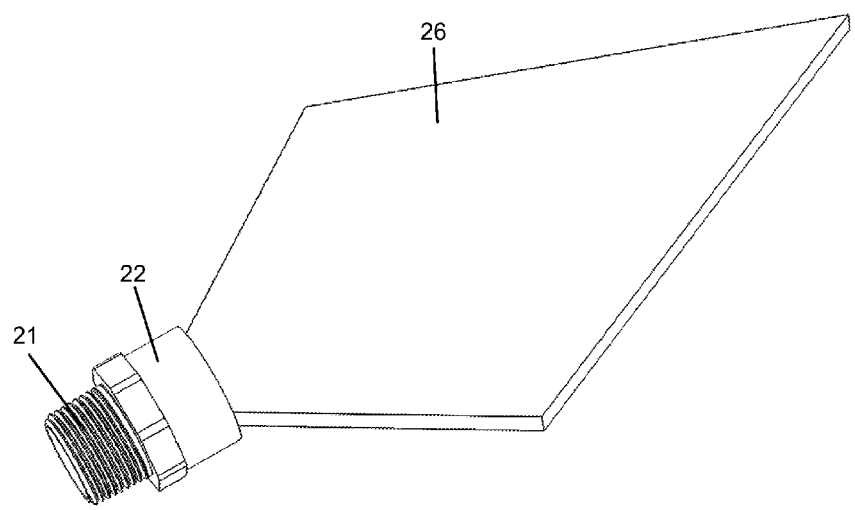
FIG. 6 shows an isometric view of a Plexiglas diamond shaped light painting photography brush of the present invention.

FIG. 6 shows an isometric view of a Plexiglas flat and diamond shaped light painting brush 26 with four flat sides instead of three as in FIG. 5. The light emitted from the light emitting device such as a flashlight will pass into the diamond shaped piece 26 and emit light along the four flat and narrow sides.

Figure 7:
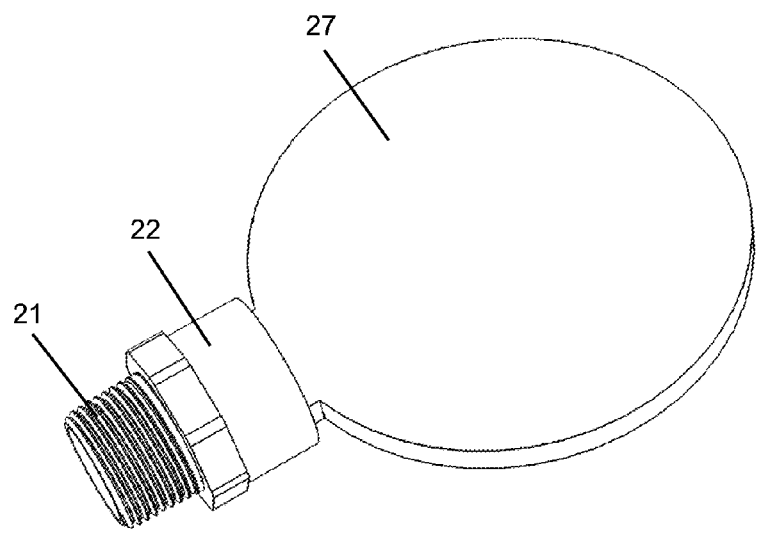
FIG. 7 shows an isometric view of a Plexiglas circular shaped light painting photography brush of the present invention.

FIG. 7 shows an isometric view of a Plexiglas flat and circular shaped light painting brush 27. In the circular shaped brush, the light will be emitted along the curved thin sides all around the circular shaped piece.

Figure 8:
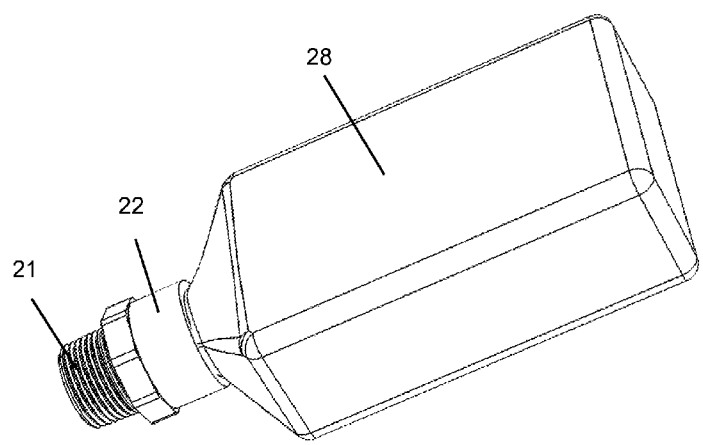
FIG. 8 shows a semi-opaque flask shaped light painting photography brush of the present invention.
Figure 9:
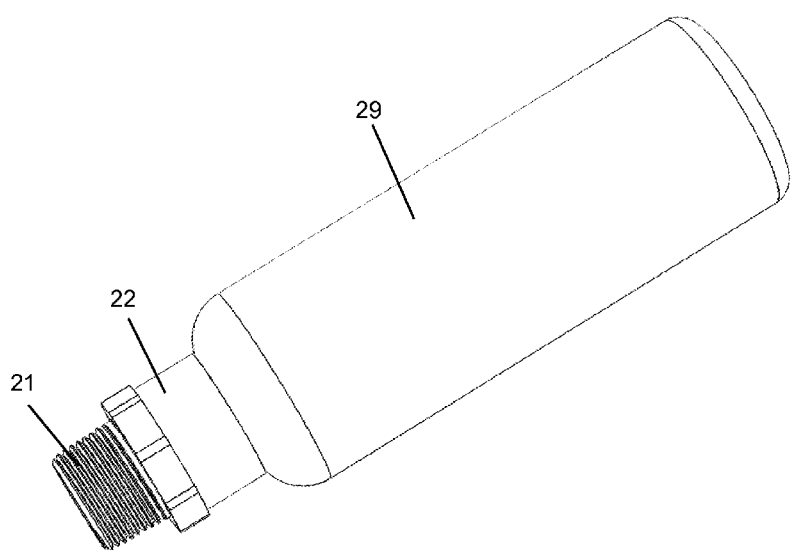
FIG. 9 shows a semi-opaque cylindrical shaped light painting photography brush of the present invention.
Figure 10:
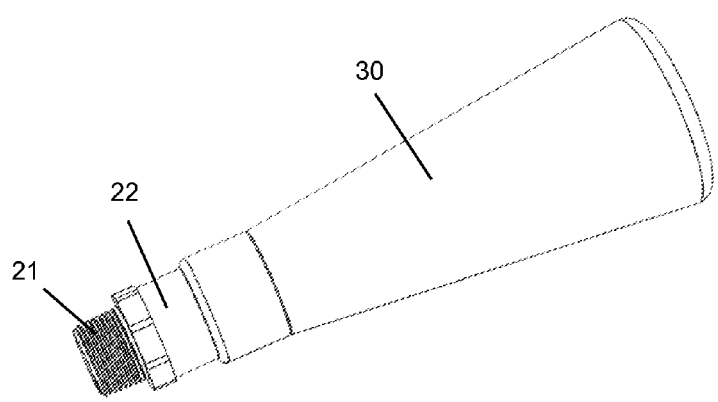
FIG. 10 shows a semi-opaque conical shaped light painting photography brush of the present invention.

FIG. 8 shows a semi-opaque hollow flask shaped light painting brush 28 which is like a hollow milk carton such as a plastic container. The light emitted by the flashlight and passing through the holder 22 will enter the hollow flask brush and light up the surfaces of the flask. FIG. 9 shows a semi-opaque hollow cylindrical shaped light painting brush 29 that is similar to the hollow flask 28 of FIG. 8 but is cylindrical in shape. FIG. 10 shows a semi-opaque hollow bottle similar to the flask of FIG. 8 and cylinder shaped of FIG. 9, but with a conical shape. When a light source shines into the flask, the entire outer surface of the flask 28 is illuminated.

Figure 11:
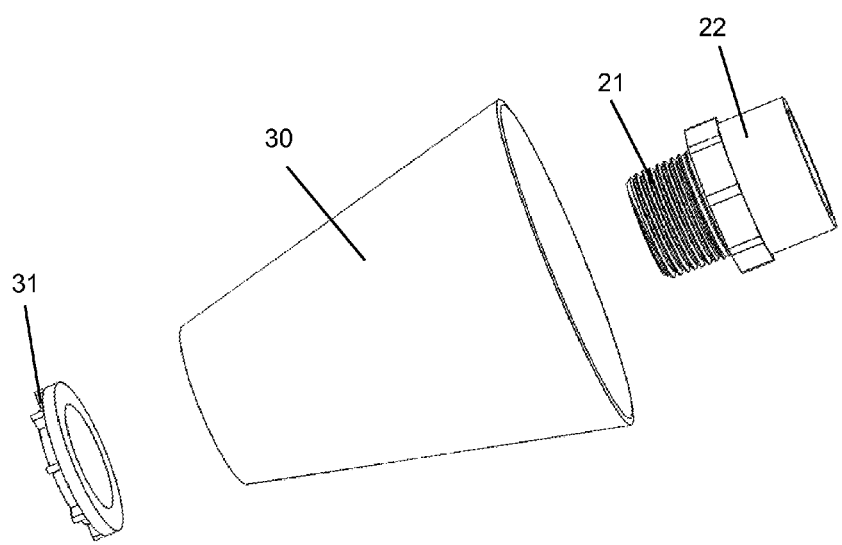
FIG. 11 shows an isometric view of a disassembled hood used for light painting photography of the present invention.
Figure 12:
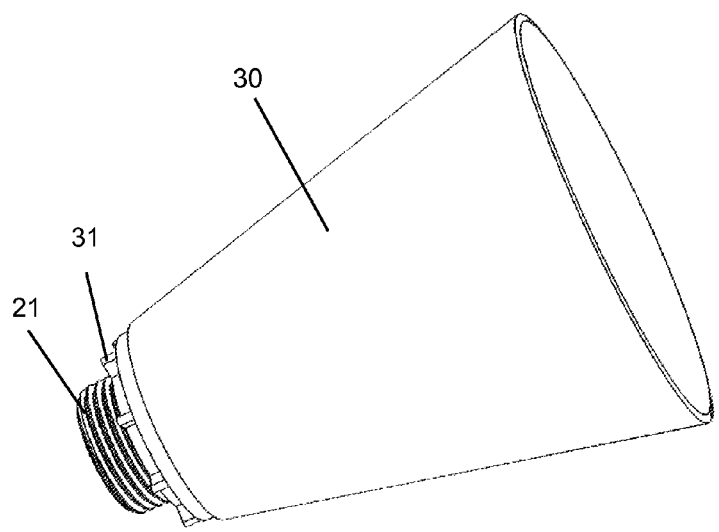
FIG. 12 shows an isometric view of an assembled hood used for light painting photography of the present invention.
Figure 13:
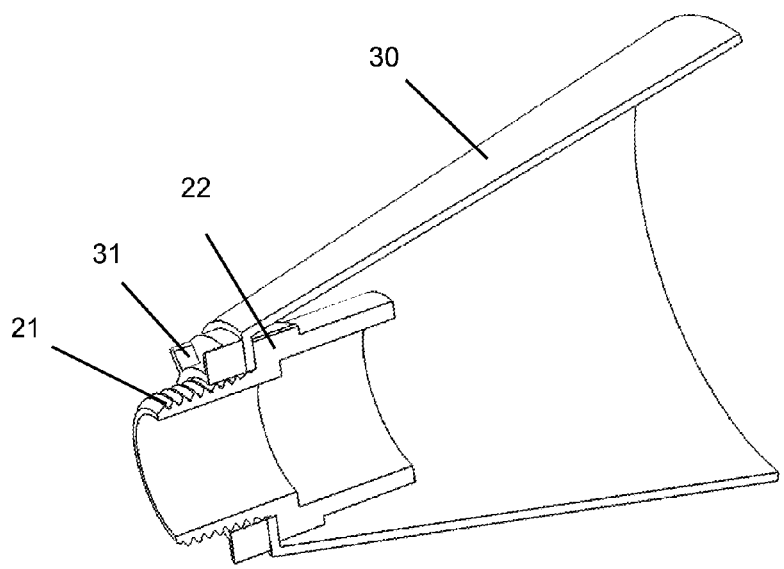
FIG. 13 shows a cut-away view of an assembled hood used for light painting photography of the present invention.

FIG. 11 shows an isometric view of a disassembled hood used for light painting. The hood is used when projecting light onto a scene. The hood blocks the brightest part of the light source to shield it from being seen by the camera during a long exposure. Hood 30 can hold a color filter to project a colored light onto a scene or any of the other light modifying devices. Without the opaque hood 30, a light emitted through the holder 22 would be seen by the camera. The hood 30 blocks the light source from being seen from the side but allows for the light to project outward. Another example would be for holding a fiber optic brush, the Hood will block out the portion of the brush closest to the light emitting device that is brighter than the rest of the Fiber Optics, making for a shorter but more uniform (in terms of lumen output) brush. The hood 30 is conical in shape and is secured to the holder 22 by a threaded member 31. FIG. 12 shows an isometric view of an assembled hood 30 that can then be attached to the small diameter end of the connector 10 for light painting. The hood of FIG. 12 is a hood and color filter, the cone shape is used to block the light, as to not have unwanted light streaks or flares while light painting during a long exposure. FIG. 13 shows a cut-away view of a hood 30 with the holder 22 and the end 21 that fits in the small diameter end 11 of the connector 10.

Figure 14:
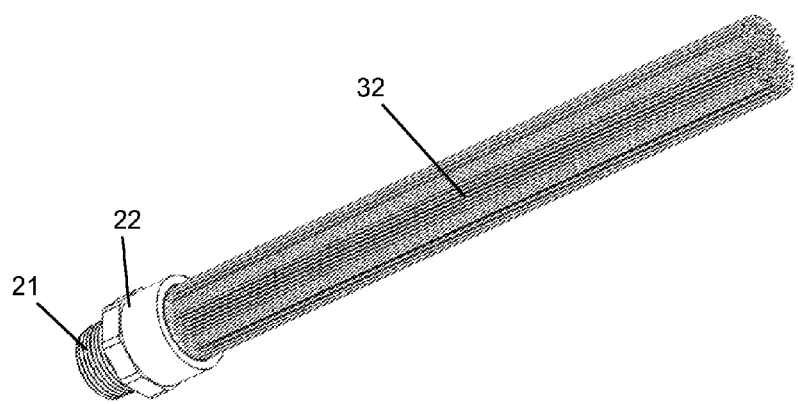
FIG. 14 shows an isometric view of a fiber optic light painting photography brush of the present invention.

FIG. 14 shows an isometric view of a fiber optic light painting brush 32 in which a bundle of light emitting fibers are attached to the holder 22. When light shines from the light emitting device and through the holder 22, the light is emitted by the fibers 32. The fibers can be white or black. In the white fiber version, the entire strand of fibers from beginning to the end of the fibers is illuminated. In the black version, only the ends of the fibers are illuminated.

Figure 15:
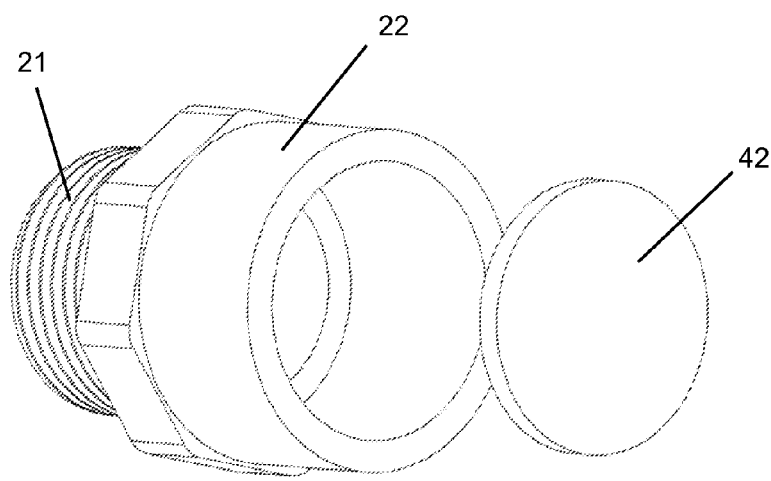
FIG. 15 shows an isometric view of a color filter holder with a color filter in front of the holder.
Figure 16:
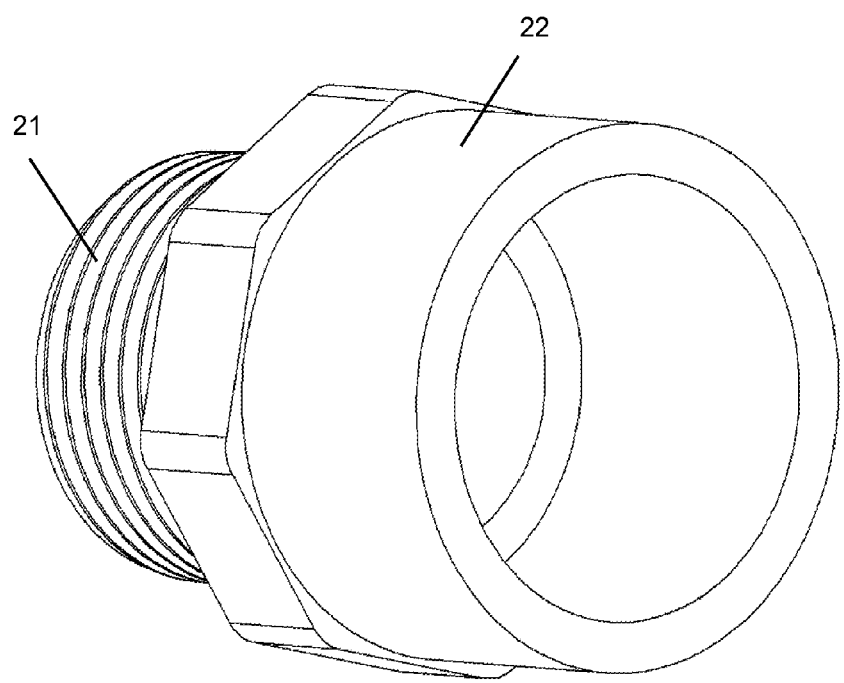
FIG. 16 shows an isometric view of a color filter holder of the present invention.
Figure 17:
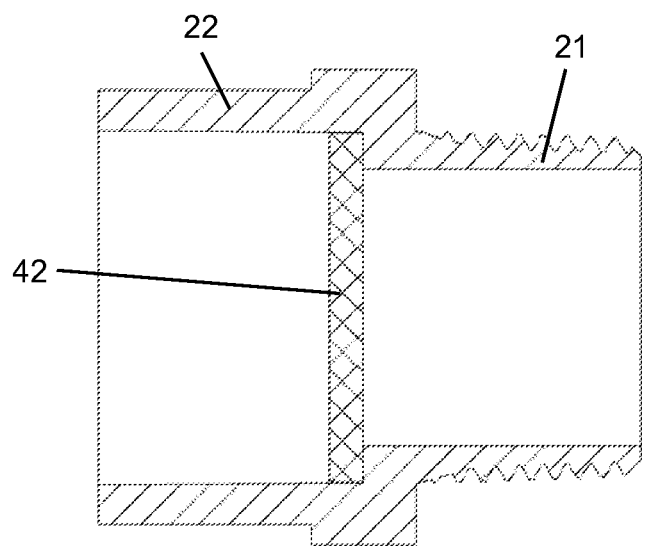
FIG. 17 shows a cross section view of a color filter holder with a color filter attached.
Figure 18:
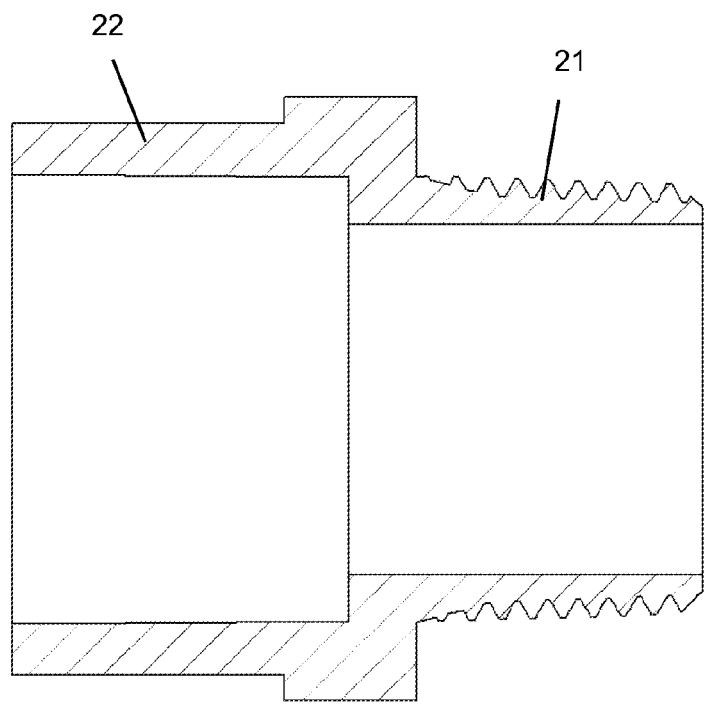
FIG. 18 shows a cross section view of a color filter holder without a color filter attached.

FIG. 15 shows an isometric view of a color filter holder which is similar to the holder 22 for earlier shown light modifying devices used for light painting with a color filter 42 in front of the holder. FIG. 16 shows an isometric view of a color filter holder 22 of the present invention. FIG. 17 shows a cross section view of a color filter holder 22 with a color filter 42 attached. FIG. 18 shows a cross section view of a color filter holder 22 without a color filter attached. The ridges on the outside of the end 21 will fit snuggly within the small diameter end 11 of the connector 10. The holder 22 can be colored to match the color of the filter attached, or to the color of the light modifying device attached thereto. The holder 21 and 22 can be formed as a single piece or from two pieces secured together. The threaded end 21 of the holder 22 is sized to fit in the smaller diameter end 11 with threads 13 of the universal connector 10. The opening on the holder 22 allows for the various light modifying devices to be secured to the holder 22 so that any of the light modifying devices can be quickly inserted or removed from the universal connector 10. As an option, the holder 22 can be color coordinated with a light modifying device so that the artist can quickly see what color the light modifying device will project. For example, is an orange colored filter 42 is attached to the holder 22, the color of the holder 21 and 22 can be the same orange color.

The holder 22 of the present invention is used to hold a light modifying device such as the diamond shaped Plexiglas piece 26 in FIG. 6. The holder 22 is then inserted into the small diameter end 11 of the connector 10. The light emitting device such as a flashlight is snuggly fitted into the conical shaped end 12 of the connector 10. The ridges 13 are flexible enough yet rigid enough to hold the holder 22 and the light emitting device so that the entire assembly can be moved about by the artist to create a light painting photography with the long exposure of the camera capturing the image. Because of the shape and material of the connector 10, another light emitting device or another light modifying device can quickly be changed and then used for additional lighting affects during the long exposure of the camera. The artist can uses several light emitting devices and several light modifying devices to produce one image that is captured by the long exposure of the camera.

I claim the following:

1. A universal connector for attaching a light emitting device to a light modifying device for use in light painting photography, the universal connector comprising:
   a cylindrical shaped side with an opening;
   a conical shaped side with an opening;
   the universal connector being hollow;

an inner surface of the cylindrical shaped side and the conical shaped side being formed with a plurality of ridges so grip an object inserted therein;

the universal connector being capable of securing to the conical shaped side different sizes of light emitting devices and being capable or securing to the cylindrical shape side different light modifying devices to create light painting photography.

2. The universal connector of claim 1, and further comprising:

the universal connector is formed from a soft rubber material such that the inner ridges allow for a light emitting device and a light modifying device to be easily inserted and removed.

3. The universal connector of claim 1, and further comprising:

a light modifying device holder that is hollow with one end having external ridges and an opposite end having a cylindrical shaped opening in which a light modifying device is attached.

4. A light modifying device holder for use in light painting photography, the light modifying device holder comprising:

a hollow cylindrical shape with one end having external ridges sized to grip a universal connector and an opposite end having a cylindrical shaped opening; and, a light modifying device attached to the cylindrical shaped opening and extending outward from and along an axis of the holder; wherein, when a light emitting device emits a light source through the holder, the light modifying device reflects light at a normal angle to the axis.

5. The light modifying device holder of claim 4, and further comprising:

the light modifying device is a translucent cylinder.

6. The light modifying device holder of claim 4, and further comprising:

the light modifying device is a Plexiglas rod.

7. The light modifying device holder of claim 4, and further comprising:

the light modifying device is a flat rectangular shaped Plexiglas sheet.

8. The light modifying device holder of claim 4, and further comprising:

the light modifying device is a flat diamond shaped Plexiglas sheet.

9. The light modifying device holder of claim 4, and further comprising:

the light modifying device is a flat circular shaped Plexiglas sheet.

10. The light modifying device holder of claim 4, and further comprising:

the light modifying device is a semi-opaque hollow flask.

11. The light modifying device holder of claim 4, and further comprising:

the light modifying device is a semi-opaque hollow cylinder.

12. The light modifying device holder of claim 4, and further comprising:

the light modifying device is a semi-opaque hollow conical shaped bottle.

13. The light modifying device holder of claim 4, and further comprising:

the light modifying device is conical shaped with an opaque side and open ends.

14. The light modifying device holder of claim 4, and further comprising:

the light modifying device is a fiber optic light painting brush in which a bundle of light emitting fibers extends out from the holder.

15. The light modifying device holder of claim 4, and further comprising:

the light modifying device is a colored light filter.

16. The light modifying device holder of claim 5, and further comprising:

the holder and the filter are of the same color.

17. A process for creating a light painting photograph comprising the steps of:

forming a universal connector having a hollow body with an open conical side and an open cylindrical side;

attaching a light modifying device to a holder having one end with external ridges;

securing a light emitting device to the conical shaped end of the universal connector;

securing the light modifying device holder to the conical shaped side of the universal connector; and, illuminating the light modifying device to create the light painting photograph.

18. The process for creating a light painting photograph of claim 17, and further comprising the step of:

forming inner surfaces of the universal connector with ridges in order to grip a light emitting device and a light modifying device.

19. The process for creating a light painting photograph of claim 17, and further comprising the steps of:

illuminating a first light modifying device with a first light emitting device; and, illuminating a second light modifying device with a second light emitting device by removing the first light emitting device and the first light modifying device from the universal connector and replacing them with a second light emitting device and a second light modifying device.

20. The process for creating a light painting photograph of claim 19, and further comprising the steps of:

the first light emitting device is different from the second light emitting device; and, the first light modifying device is different from the second light modifying device.

* * * * *